United States Patent [19]

Eick et al.

[11] Patent Number: 4,926,629
[45] Date of Patent: May 22, 1990

[54] LOW COST FUEL SUPPLY SYSTEM FOR GAS TURBINE ENGINES

[75] Inventors: Christopher D. Eick, Phoenix; Kenneth P. Worcester, Tempe; John R. Williamson, Paradise Valley, all of Ariz.

[73] Assignee: Allied-Signal Inc., Phoenix, Ariz.

[21] Appl. No.: 264,235

[22] Filed: Oct. 28, 1988

[51] Int. Cl.⁵ ............................... F02C 9/26
[52] U.S. Cl. ..................... 60/39.281; 60/734; 251/30.01
[58] Field of Search ............... 60/39.281, 734; 415/225, 226, 148; 251/30.01, 33

[56] References Cited

U.S. PATENT DOCUMENTS

| | | |
|---|---|---|
| 3,088,406 | 5/1963 | Horner . |
| 3,114,532 | 12/1963 | Gray et al. ............ 251/30.01 |
| 3,178,884 | 4/1965 | Boardman, Jr. . |
| 3,231,002 | 1/1966 | Lehrer . |
| 3,292,367 | 12/1966 | Bauger et al. . |
| 3,312,445 | 4/1967 | Trombatore et al. ......... 251/30.01 |
| 4,015,426 | 4/1977 | Hobo et al. ........... 60/39.281 |
| 4,033,112 | 7/1977 | Schuster ............. 60/39.281 |
| 4,585,206 | 4/1986 | Itoh . |
| 4,640,093 | 2/1987 | Eastman . |

Primary Examiner—Louis J. Casaregola
Attorney, Agent, or Firm—R. Steven Linne; James W. McFarland

[57] ABSTRACT

A high speed liquid vortex pump is fitted with an electrically controlled needle valve assembly which modulates the pressure of a small portion of the working fluid which in turn moves a spool valve to regulate the high volume, high pressure pump output flow.

10 Claims, 1 Drawing Sheet

LOW COST FUEL SUPPLY SYSTEM FOR GAS TURBINE ENGINES

TECHNICAL FIELD

This invention relates generally to rotary fluid pumps and more specifically to a high speed, forced vortex, liquid pump having a simple, low cost, output flow control which is based on a spring biased metering spool positioned by, or responsive to, a pressure modulated stream of the working fluid.

BACKGROUND OF THE INVENTION

High speed, forced vortex pumps have been known since at least the early 1940's when they were investigated by Dr. U. M. Barske for use in rocket propulsion systems but they have not found wide commercial use since, probably because of their unfamiliar pumping characteristics. Physically, they somewhat resemble the common centrifugal pump but they operate on altogether different principles. A centrifugal pump uses a screw-shaped or scrolled impeller to force all the fluid which enters the pump to be thrown outwardly into an annular discharge channel. Since the fluid moves quickly through the pump, the residence time for any particular portion of the fluid is very short, often less than one revolution of the impeller, thus there is a considerable difference in relative speed between the fluid and the impeller. The characteristics of such pumps are generally well-known and they are commonly used to supply very large flows of fluids at low to moderate pressures.

In contrast, a forced vortex pump (not to be confused with a liquid-ring pump) is based on rapidly rotating a body of fluid and withdrawing only a relatively small portion of the fluid so that the remainder may be considered, for design purposes, almost as a rotating solid body. In its original form, such a pump consisted of a rotating drum with baffles or blades fixed to its inside walls for developing the rotating body. Fluid entered the drum through its hub and was picked up near its periphery by a stationary, internal pickup tube which exited the drum through the hub. Difficulties with adapting this design for various applications led to an inverted design in which a simple, straight impeller with long blades was used to create a rapidly rotating fluid vortex within a short cylindrical cavity within a fixed housing surrounding the rotating impeller. The outer portion of the fluid vortex, adjacent the smooth housing wall, is at a high pressure while the inner portion is at a much lower pressure. Typically, the high pressure fluid is extracted from the housing through a tangential diffuser section where much of the kinetic energy (velocity) of the fluid is converted to static or potential energy (pressure). The pressure level at the discharge is determined by the diameter and rotational speed of the impeller, while the maximum output flow rate is directly related to the size of the diffuser throat at any given rotational speed. Very small, simple pumps can put out moderate flows at high pressure if all the components are carefully designed. In addition, these pumps can operate satisfactorily at very low input pressures, close to the vapor pressure of the fluid, without cavitation. More importantly, the output pressure is practically constant for all rates of flow at any given speed and the output capacity is approximately proportional to the impeller speed (up to a maximum value determined by the number and size of the discharge). This characteristic is sometimes a disadvantage. For example, one potential application of such pumps is in a fuel supply system for expendable gas turbine engines for missile propulsion. However, in such a system the pump would preferably be driven at a fixed speed determined by the rotational speed of the turbine engine (i.e., direct drive) rather than at a variable speed (i.e., separate pump motor) determined by fuel flow required. Such systems would then necessarily include a separate high pressure, hydromechanical fuel control unit to regulate the amount of fuel delivered to the engine. Such control units are usually very complex and expensive. What is needed is a simple and inexpensive way to vary the pump output directly.

In view of the foregoing, it should be apparent that there is a need in the art for improvements in the design and construction of output flow controls for high speed vortex pumps.

It is therefore an object of the present invention to provide an improved method and apparatus for controlling the output flow rate of a vortex pump used to supply large flows of fuel to gas turbine engines.

A further object of this invention is to provide a highly reliable but low weight fuel supply system for gas turbine engines.

It is another object of the invention to provide a simple, low cost, electrically actuated flow control device for a fluid pump operating at a relatively fixed rotational speed.

SUMMARY OF THE INVENTION

The present invention aims to overcome the disadvantages of the prior art as well as offer certain other advantages by providing a small, high speed vortex pump fitted with a novel, electrically controlled, needle valve assembly in the discharge flow path. The flow area of the pump discharge, and thus the pump output flow rate, is varied by moving an in-line, spring biased, metering spool with a pressure modulated control stream of the working fluid from the needle valve assembly.

Preferably, the stream pressure is controlled by an electrical motor, solenoid, or other device which moves a needle valve member to variably cover and uncover an orifice to allow a portion of the high pressure working fluid to bleed into and through a chamber behind (i.e., the end opposite the pump) the metering spool. This controlled pressure, in combination with the spring bias force, balances or offsets the high pressure flowing from the vortex pump which tends to open the metering spool. Thus a low power electrical device moving a small needle valve allows accurate adjustment of the much higher pressure and volume flow from a vortex pump. In addition to only having a few moving parts, the preferred embodiment of this invention submerges the electrical device (e.g., solenoid) in the fluid flow stream to prevent overheating and thus further improve reliability.

BRIEF DESCRIPTION OF THE DRAWINGS

While this specification concludes with claims particularly pointing out and distinctly claiming the subject matter which is regarded as the invention, it is believed that the objects, features, and advantages thereof may be better understood from the following detailed description of a presently preferred embodiment when taken in connection with the accompanying drawings in which:

DESCRIPTION OF THE PREFERRED EMBODIMENT

Figure 1:
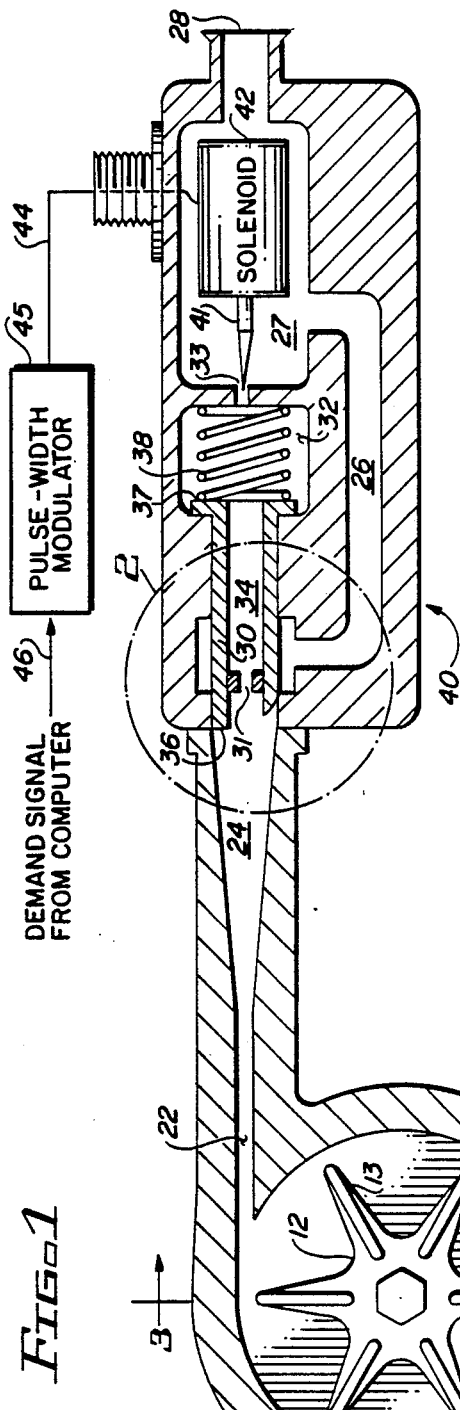
FIG. 1 is a schematic illustration of the present invention showing a cross-sectional view taken in a plane parallel to the longitudinal axis of the metering body.
Figure 3:
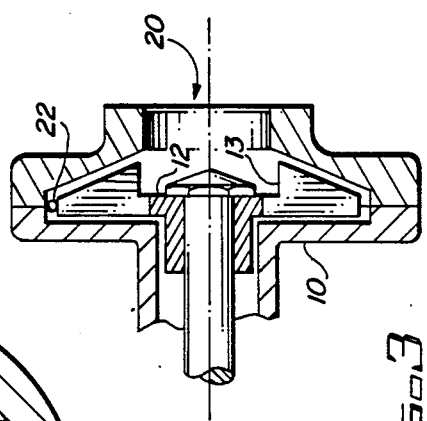
FIG. 3 is a cross-sectional illustration taken parallel to the pump axis along lines 3—3 of FIG. 1.

Referring to FIGS. 1 and 3, a rigid housing (10) contains a generally cylindrical pumping cavity called the pump bowl (11). The bowl (11) contains a rotatable impeller (12) having a number of straight blades (13) extending radially therefrom for rapidly rotating fuel in the bowl (11).

The pump housing (10) also contains a fuel inlet (20) to the center of the bowl (11) and a fuel outlet having two sections. A straight, tubular, throat section (22) extends tangentially from the periphery of the bowl (11). The throat (22) extends into a conically diverging diffuser section (24) which leads into the attached flow metering body (40).

Figure 2:
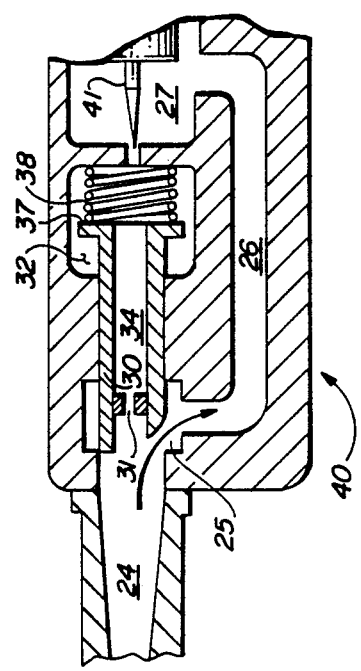
FIG. 2 is a fragmentary view of a portion of FIG. 1 showing the metering spool slid open.

As best seen in FIG. 2, the metering body (40) contains a slidable metering spool (30) with a front face (36) movably blocking a metering area or slot (25) near the end of the pump's diffuser section (24). When unblocked, the metering slot (25) is in flow communication with a main fuel passage (26) leading into an exit chamber (27) which has an outlet (28) for connection to a gas turbine engine fuel injection system (not shown) or other consuming device.

A bleed passage (34) runs axially through the hollow metering spool (30) and communicates with a variable pressure cavity (32) formed in the body (40) at the opposite end (37) of the spool. Preferably, the bleed passage (34) contains a fixed orifice (31) for accurately metering fuel flow through the passage (34) and into the cavity (32) as will be explained later. The variable pressure cavity (32) contains a spring (38) acting against the rear face (37) of the metering spool (30) for urging it to block or close the metering slot (25) in the absence of sufficient high pressure fuel acting on the front face (36) of the spool (30). The cavity (32) has an outlet orifice (33) which is variably blocked by a movable needle valve member (41) attached to an electrical motive device (42), such as a solenoid, linear stepper motor or torque motor. Preferably, the motive device (42) is located within the adjacent exit chamber (27) to which the orifice (33) communicates. Alternately, the device (42) could be placed in the variable pressure cavity (32) if overheating is not a problem. However, the preferred motive device (42) may be subject to overheating. It is a linear solenoid driven by chain of electrical pulses (44) from a pulse width modulator (45). The chain of pulses (44) is at a higher frequency than the solenoid can respond to so that the solenoid stroke, and thus the needle valve (41) position, is a function of the pulse width. The pulse width is set by the modulator (45) in proportion to a fuel demand signal (46) from the gas turbine. Preferably, the modulator (45) will also have conditioning circuits, for the control of inductive flyback, and current charging circuits (each tailored for the particular electrical device or solenoid selected), in order to linearize the system parameters. Such details are well known in the electrical arts and need not be repeated here.

During use, a small diameter impeller (12) is rotated at high speed, e.g., several thousand revolutions per minute. Fuel is supplied to the pump inlet (20) and flows into the pump bowl (11). The rotating impeller blades (13) force the fuel to spin and form a high speed vortex within the bowl (11). Since the pressure of a spinning liquid increases approximately according to the square of the radius of revolution, the pressure near the tips of the blades (13) will be much greater than near the inlet (20). A useable portion, up to several thousand pounds per hour, of the high pressure fuel is withdrawn through the tangential outlet (22).

As the rapidly moving fuel flows through the pump's diffuser section (24), its pressure is increased. That is, the kinetic energy of velocity is changed into additional static energy or pressure. This high pressure acting against the front face (36) of the metering spool (30) forces it to slide away from the metering slot (25) so that fuel can flow into the main fuel bypass passage (26) and on to the exit chamber (27) where it may be routed to the turbine engine via the outlet connection (28).

To control the output flow rate, a small portion of the high pressure fuel acting on the front face (36) of the metering spool (30) is bled through the hollow interior passage (34) into the variable pressure cavity (32) behind the spool (30). The fixed orifice (31) in the passage (34) restricts the amount of fuel flowing into the cavity (32) while the needle valve (41) in the outlet orifice (33) variably restricts the amount of fuel flowing out of, and therefore varies the pressure within, the cavity (32). That is, the greater the restriction, the slower the outflow and thus the higher the pressure in the cavity (32). For example, when the needle (41) is retracted from the outlet orifice (33), the pressure of the fuel within the cavity (32) and thus the force acting on the rear face (37) of the spool (30) is reduced, thereby allowing the high pressure fuel acting on the spool's front face (36) to slide it away from the metering slot (25). Fuel then flows through the main bypass (26) to the exit chamber (27) where it cools the solenoid (42) before going to the engine.

In order to reduce the pump output flow rate to any desired value, an electrical demand signal (46) is sent through the modulator (45) to the motive device (42) so that needle valve member (41) is moved toward the variable orifice (33). As more fuel flows into the cavity (32) through bleed passage (34), the pressure increases against the spool's rear face (37) which causes the metering spool (30) to slide towards the pump and reduce the flow area of the metering slot (25). Preferably a bias spring (38) provides a slight additional force to slide the spool (30) closed to overcome any friction or other losses in the assembly. Since the cross-sectional flow area of the metering slot (25) is thereby reduced, the output flow rate is proportionally reduced. Since the pressure of the fuel in the pump bowl (11) is not significantly affected by a reduction in output flow rate, the control system is inherently stable. This is contrary to what would be expected if the pump was a conventional centrifugal pump in which the outlet pressure increases as the output flow is restricted.

A model of the present invention was analyzed to determine some of the characteristics, and thereby illustrate the advantages, thereof for use as a fuel supply and metering system for a small expendable gas turbine engine in a missile. A vortex pump, having a 2 to 2½ inch diameter impeller rotated at about 50,000 rpm, supplied a flow of fluid to the metering body (40) at a substantially constant pressure of about 1100 psia at the diffuser (24).

The needle valve member (41) was adjusted to vary its distance form the orifice (33) from a substantially blocked position (i.e., 0.001 inch distance) up to a maximum open distance of 0.015 inch from the orifice (33). The fluid pressure in the variable pressure cavity varied from about 1099 psia, when the needle was in the blocking position, to about 1070 psia, when the needle was fully opened. This variable fluid pressure moved the metering spool (30) over a stroke distance of about 0.5 inch which in turn varied the cross-sectional flow area of the metering slot (25) and regulated the amount of fluid flowing into the main bypass (26) from 0 to about 1350 pounds per hour at a substantially constant delivery pressure of about 1040 psia. Thus, only 3 moving parts, spool (30), spring (38) and needle (41), accurately control high pressure, high volume fluid flow.

While in order to comply with the statute, this invention has been described in terms more or less specific to one or two preferred embodiments, it is expected the various alterations, modifications, or permutations thereof will be apparent to those skilled in the art. For example, the electrical motive device could be a torque motor, a linear stepper motor or other means for moving the needle valve. Therefore, it should be understood that the invention is not to be limited to the specific features shown or described but it is intended that all equivalents be embraced within the spirit and scope of the invention as defined by the appended claims.

What is claimed is:

1. Apparatus for supplying and metering fuel to a gas turbine engine, comprising in combination:
   vortex pump means for supplying flow of said fuel through a diffuser at substantially constant pressure regardless of flow rate;
   a fuel metering body having an inlet, an outlet and a first fuel flow path providing fluid communication between said inlet and said outlet, said inlet being in fluid communication with said diffuser to receive said flow of fuel from said pump and said outlet being in flow communication with said engine;
   said body also having therein a variable pressure cavity, a second flow path providing fluid communication between said inlet and said pressure cavity, and an orifice providing communication between said cavity and said outlet;
   a metering spool slidably disposed in said body to define a variable flow metering area between said inlet and said first flow path;
   means, disposed in said pressure cavity for biasing said spool in a direction tending to decrease said flow area: and
   means, responsive to electrical signals indicating fuel demand for said engine, for variably blocking said orifice;
   whereby said flow area varies proportionally to a difference between fuel pressure in said variable pressure cavity and said substantially constant pressure.

2. The apparatus of claim 1 wherein said body contains an exit chamber in said first flow path adjacent said outlet, said chamber surrounding said means for variably blocking said orifice.

3. The apparatus of claim 2 wherein said means for variably blocking said orifice include a movable needle valve member attached to an electrical motive device.

4. The apparatus of claim 3 wherein said electrical motive device is a solenoid driven by a pulse width modulator.

5. The apparatus of claim 3 wherein said electrical motive device is a linear stepper motor.

6. The apparatus of claim 1 wherein said metering spool has a front face exposed to said substantially constant pressure and a rear face exposed to fuel pressure in said variable pressure cavity.

7. The apparatus of claim 6 wherein said second flow path passes through said metering spool from said front face to said rear face.

8. The apparatus of claim 1 wherein said means for biasing said spool includes a spring.

9. The apparatus of claim 1 wherein said inlet, said metering spool, said pressure cavity, said orifice and said outlet all lie along a common longitudinal axis through said body.

10. Rotary fluid pumping and metering apparatus comprising in combination:
    a pump housing forming a generally cylindrical pump bowl therein; said housing having a pump inlet aligned with the longitudinal axis of said generally cylindrical pump bowl and in flow communication therewith;
    an impeller located within, and rotatable about the longitudinal axis of, said bowl; said impeller having a plurality of radially extending straight blades;
    a pump outlet in said housing extending tangentially from the periphery of said pump bowl and having a first, generally tubular, throat section, in communication with said bowl, and a second outwardly diverging conical section downstream of said first section;
    a metering body, having a body inlet downstream of and in flow communication with said conical section, a variable flow area metering slot downstream of said inlet and in flow communication with a main fluid passage; said main passage terminating in a body outlet for delivering a metered flow of fluid; a tubular metering spool slidably disposed in said metering body and having a front face defining said variable flow area metering slot, a rear face disposed within a variable pressure cavity formed in said body, and a bleed passage through said spool allowing for flow communication between said front face and said rear face;
    a spring disposed in said variable pressure cavity and acting against said rear face for biasing said spool towards reducing said variable flow area metering slot, a variable area orifice providing flow communication between said variable pressure cavity and said main fluid passage; and
    a solenoid positioned needle valve member disposed in said main fluid passage adjacent said orifice and adapted to vary the flow area of said orifice;
    whereby the position of said needle valve regulates the fluid pressure in said variable pressure cavity which pressure in turn controls the position of said metering spool and thereby the flow area of said variable area metering slot to any desired value.

* * * * *